Feb. 17, 1970  B. RODGERS  3,495,681
JET SILENCER FOR AN AIRCRAFT JET ENGINE
Filed March 25, 1968

Inventor
Barry Rodgers
By
Cushman, Darby·Cushman
Attorneys

United States Patent Office 3,495,681
Patented Feb. 17, 1970

3,495,681
JET SILENCER FOR AN AIRCRAFT JET ENGINE
Barry Rodgers, Mansfield, England, assignor to Rolls-Royce Limited, Derby, England, a British Company
Filed Mar. 25, 1968, Ser. No. 715,788
Claims priority, application Great Britain, Apr. 7, 1967, 16,150/67
Int. Cl. F01n *1/16*
U.S. Cl. 181—45                                  9 Claims

ABSTRACT OF THE DISCLOSURE

A jet silencer for an aircraft comprises a hollow body portion through which jet gases are adapted to flow, three jet nozzles or some other bubble-like configuration in cross-section and a butterfly valve movable into and out of a closed position in which jet flow is prevented or reduced through one or more of the jet nozzles.

---

This invention concerns a jet silencer for an aircraft jet engine.

According to the present invention, there is provided a jet silencer for an aircraft jet engine comprising a hollow body portion adapted for the flow therethrough of jet gases and provided at the outlet end thereof with a plurality of jet nozzles, and valve means movable into and out of a closed position in which jet flow through a selected one or more only of the said jet nozzles is prevented or reduced, the jet flow through the remainder of the nozzles being symmetrical about the engine axis.

As will be appreciated, the noise from a jet silencer in accordance with the present invention may be reduced, e.g. at landing, by moving the said valve means into the said closed position.

The valve means are preferably movable into an open position in which they do not substantially obstruct the flow of jet gases. Thus, the or each said selected jet nozzle may be provided with a butterfly valve.

The said jet nozzles may be arranged in at least one row, the jet nozzles of the or each said row preferably being vertically aligned. If this is done, the noise emitted by one of the jet nozzles masks, to some extent, the noise emitted by any of the jet nozzles disposed vertically above it.

Preferably adjacent jet nozzles contact each other.

The said valve means preferably prevent flow through at least 30% of the total nozzle area, and may, for example, prevent flow through substantially 50% thereof.

The said body portion may have an internal cross section which is substantially circular at the inlet end thereof and which changes smoothly towards the outlet end thereof by way of a figure of eight configuration to a bubble-like configuration, i.e. comprising more than two bubbles.

The invention also comprises a jet engine, or an aircraft provided therewith, having a jet silencer as set forth above.

Figure 1:
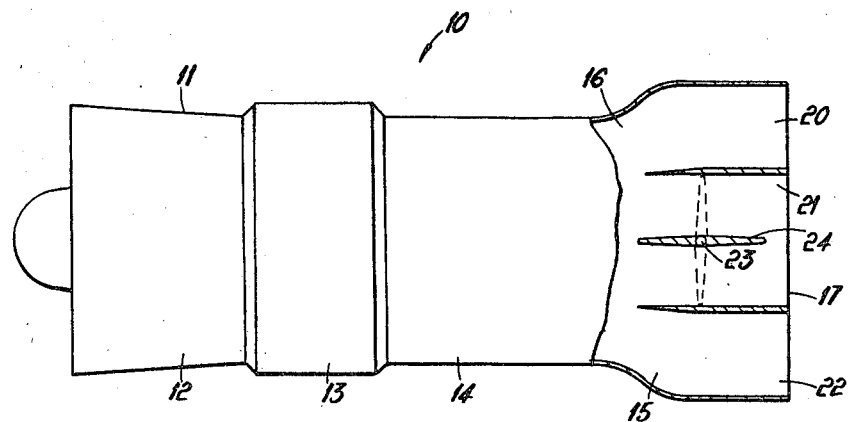
Figure 2:
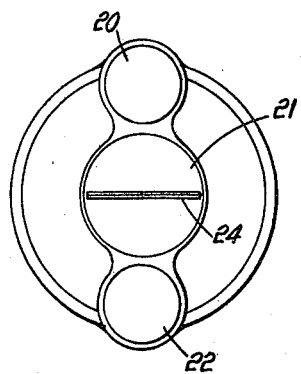

The invention is illustrated, merely by way of example, in the accompanying drawings, in which:

FIGURE 1 is a diagrammatic side view, partly in section, of a gas turbine jet engine having a jet silencer in accordance with the present invention, and FIGURE 2 is a rear elevation of the said jet silencer.

In FIGURE 1 there is shown a gas turbine jet engine 10 which is adapted to be mounted in an aircraft (not shown) to effect forward propulsion thereof. The jet engine 10 has an engine casing 11 within which there are disposed, in flow series, one or more compressors 12, combustion equipment 13, and one or more turbines 14. The turbine exhaust gases are directed to atmosphere through a jet silencer 15 which forms the downstream end of the engine casing 11.

The jet silencer 15 has a hollow body portion 16 which is adapted for the flow therethrough of the jet gases and which is provided at its outlet end 17 with three jet nozzles 20, 21, 22 (or with some other bubble-like configuration, i.e. a configuration comprising more than two bubbles). The nozzle 21 constitutes 50% of the total nozzle area, while each of the nozzles 20, 22 constitutes 25% thereof.

The body portion 16 may have an internal cross section which is substantially circular at the inlet end thereof and which changes smoothly towards the outlet end 17 thereof by way of a figure of eight configuration (not shown) to the bubble-like configuration shown.

As will be noted, the jet nozzles 20, 21, 22 are arranged in a single row, are vertically aligned, and adjacent jet nozzles contact each other. This construction ensures that the noise from the jet nozzle 22 will, to some extent, mask that of the jet nozzles 20 and 21 which are vertically above it, while the noise from the jet nozzle 21 will mask the noise from the jet nozzle 20.

Pivotally mounted on a pivot 23 in the jet nozzle 21 is a butterfly valve 24. The butterfly valve 24 is movable (by means not shown) between an open position, shown in full lines in FIGURE 1, in which it does not substantially obstruct the flow of jet gases through the jet nozzle 21, and a closed position, shown in dotted lines in FIGURE 1, in which it prevents flow through the jet nozzle 21.

It will thus be appreciated that when the butterfly valve 24 is in its closed position, jet flow through the jet nozzle 21, but not through the jet nozzles 20, 22, is prevented. Thus flow through 50% of the total nozzle area is prevented with a consequent reduction in jet noise. This reduction can, of course, be effected only when full thrust is not required, e.g. at landing.

In our British Patent No. 886,201 there is described and claimed a jet silencer for an aircraft comprising a hollow body portion through which, in operation, the jet gases flow, said body portion having an internal cross-section which is substantially circular at the inlet end thereof and which changes smoothly towards the outlet end thereof by way of a figure of eight configuration to a bubble-like configuration i.e. comprising more than two bubbles, the outlet end of the body portion being provided with a plurality of jet nozzles arranged in one or more rows.

I claim:
1. A jet silencer for an aircraft jet engine comprising a hollow body portion adapted for the flow therethrough of jet gases, a plurality of jet nozzles provided at the outlet end of said hollow body, and valve means movable into and out of a closed position in which jet flow is reduced through at least a selected one of the said jet nozzles, the jet flow through the remainder of the nozzles being symmetrical about the engine axis.

2. A jet silencer as claimed in claim 1 in which the valve means are movable into an open position in which they do not substantially obstruct the flow of jet gases.

3. A jet silencer as claimed in claim 2 in which said at least one selected jet nozzle is provided with a butterfly valve.

4. A jet silencer as claimed in claim 1 in which the said jet nozzles are arranged in at least one row.

5. A jet silencer as claimed in claim 4 in which the jet nozzles of the said at least one row are vertically aligned.

6. A jet silencer as claimed in claim 5 in which adjacent jet nozzles contact each other.

7. A jet silencer as claimed in claim 1 in which the valve means prevent flow through at least 30% of the total nozzle area.

8. A jet silencer as claimed in claim 1 in which the said body portion has an internal cross section which is substantially circular at the inlet end thereof and which changes smoothly towards the outlet end thereof by way of a figure eight configuration to a bubble-like configuration comprising more than two bubbles.

9. A jet engine having a jet silencer as claimed in claim 1.

References Cited

UNITED STATES PATENTS 2,664,700   1/1954   Benoit.
2,928,238   3/1960   Hawkins.

ROBERT J. WARD, JR., Primary Examiner

181—60, 64; 239—265.13